United States Patent
Baily et al.

(10) Patent No.: US 9,567,503 B2
(45) Date of Patent: Feb. 14, 2017

(54) ORGANOSILOXANE COMPOSITIONS

(71) Applicant: DOW CORNING CORPORATION, Midland, MI (US)

(72) Inventors: Victor Baily, Braine-l'Alleud (BE); Frederic Gubbels, Houtain-le-Val (BE); Stephanie Lobry, Romb. Marchipont (FR)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/415,267

(22) PCT Filed: Jul. 18, 2013

(86) PCT No.: PCT/EP2013/065249
§ 371 (c)(1),
(2) Date: Jan. 16, 2015

(87) PCT Pub. No.: WO2014/013038
PCT Pub. Date: Jan. 23, 2014

(65) Prior Publication Data
US 2015/0175863 A1    Jun. 25, 2015

(30) Foreign Application Priority Data

Jul. 18, 2012 (GB) .................................. 1212782.5

(51) Int. Cl.
| C09J 183/04 | (2006.01) |
| C09K 3/10 | (2006.01) |
| C08L 83/04 | (2006.01) |
| B32B 37/12 | (2006.01) |

(52) U.S. Cl.
CPC ......... C09K 3/1018 (2013.01); B32B 37/1284 (2013.01); C08L 83/04 (2013.01); C09J 183/04 (2013.01); B32B 2551/00 (2013.01); C08L 2205/025 (2013.01)

(58) Field of Classification Search
None
See application file for complete search history.

(56) References Cited

U.S. PATENT DOCUMENTS

| 3,445,420 | A |  | 5/1969 | Kookootsedes et al. |
| 3,844,992 | A | * | 10/1974 | Antonen ................. C08L 83/04 264/331.11 |
| 3,960,802 | A | * | 6/1976 | Beers ................... C08G 77/398 264/102 |
| 5,661,210 | A |  | 8/1997 | Burns et al. |
| 6,528,580 | B1 |  | 3/2003 | Feder et al. |
| 8,080,614 | B2 |  | 12/2011 | Morita et al. |
| 2007/0088123 | A1 |  | 4/2007 | Futatsumori et al. |
| 2007/0116907 | A1 | * | 5/2007 | Landon ................... C03C 27/10 428/34 |
| 2008/0251200 | A1 | * | 10/2008 | Kimura ................... C08L 83/04 156/329 |
| 2009/0082498 | A1 | * | 3/2009 | Kimura ................... C08L 83/04 524/188 |
| 2009/0146175 | A1 | * | 6/2009 | Bahadur ................. H01L 33/56 257/100 |
| 2009/0179180 | A1 | * | 7/2009 | Morita .................... C08L 83/04 252/501.1 |
| 2011/0034581 | A1 | * | 2/2011 | Bae ........................ C08G 77/04 523/122 |
| 2011/0151154 | A1 | * | 6/2011 | Landon .................. B82Y 30/00 428/34 |
| 2011/0254047 | A1 | * | 10/2011 | Yoshitake ............... C08L 83/04 257/100 |
| 2012/0056236 | A1 | * | 3/2012 | Hamamoto ............. C08L 83/04 257/100 |

FOREIGN PATENT DOCUMENTS

| CN | CN101466795 A | 6/2009 |
| EP | 1254192 A2 | 7/2001 |
| GB | 2249552 A | 5/1992 |
| GB | 2424898 A | 10/2006 |
| WO | WO9321245 A1 | 10/1993 |
| WO | WO0149774 A2 | 7/2001 |
| WO | WO01049789 A2 | 7/2001 |
| WO | WO2008152042 A1 | 12/2008 |
| WO | WO2011051173 A1 | 5/2011 |

OTHER PUBLICATIONS

PCT/EP2013/065249 International Search Report dated Dec. 20, 2013, 3 pages.
English language abstract for EP1254192A2 extracted from espacenet.com database on Jan. 15, 2014, 2 pages.

* cited by examiner

Primary Examiner — Robert S Loewe
(74) Attorney, Agent, or Firm — Warner Norcross & Judd LLP

(57) ABSTRACT

A curable phenylorganosiloxane polymer composition comprising: (a) 100 parts by weight of a phenylorganosiloxane having a viscosity of at least 10000 mPa·s at 25° C. and at least two reactive groups per molecule selected from (i) —OH or hydrolysable groups and (ii) unsaturated groups; (c) 0 to 500 parts by weight of fillers per 100 parts by weight of (a); (d) a suitable cure package comprising a cross-linker and a catalyst the suitable cure package being selected from a silane or polyorganosiloxane and a condensation catalyst when (a) is (a) (i) or a hydrosilylation catalyst when (a) is (a) (ii); and (b) 0.1 to 300 parts by weight of at least one phenyl siloxane resin per 100 parts by weight of (a). The compositions are especially useful in sealants (particularly in sealants for insulating glass units (IGUs), due to their low gas permeability), in conformal coatings and for corrosion protection.

14 Claims, No Drawings

ORGANOSILOXANE COMPOSITIONS

CROSS-REFERENCE TO RELATED APPLICATIONS

This application is the National Stage of International Patent Application No. PCT/EP2013/065249, filed on Jul. 18, 2013, which claims priority to and all advantages of GB Patent Application No. 1212782.5, filed on Jul. 18, 2012, the content of which is hereby incorporated by reference.

This relates to phenylorganosiloxane based sealant formulations, which contain a phenylorganosiloxane polymer together with one or more phenyl containing siloxane based resins which subsequent to cure, provide sealants exhibiting superior mechanical properties.

Phenylorganosiloxane based materials in particular phenylalkylsiloxanes, such as phenylmethylsiloxanes, are known in the art to exhibit low gas permeability, making them particularly suitable for use in sealants for sealing spaces against the ingress/egress of gasses. Hence, phenylmethylsiloxanes having viscosities of at least 10,000 mPa·s at 25° C., alternatively viscosities of greater than 60,000 mPa·s at 25° C. are industrially highly desired polymers but have proven to be extremely difficult to manufacture other than in a copolymeric form. The use of a copolymer of dimethyl and phenylmethyl siloxane in a low gas permeable sealant has been mentioned in GB 2,249,552. The copolymer is used as a binder in combination with shaped fillers and the resulting sealant is used in sealing multiple-pane insulating glass units. These units typically comprise a plurality of panes of glass containing a gas, for example argon, in an interior space sealed at the periphery. Satisfactory sealing of the units is necessary since egress of argon gas from an insulating glass unit can lead to implosion of the unit. In such extreme cases, the sealant exhibits gas selectivity towards argon, nitrogen and oxygen. However the use of such a copolymer in a sealant formulation is of concern because of the presence of potentially hazardous by-products of the copolymerisation process, particularly 2,6-cis-diphenylhexamethylcyclotetrasiloxane, which may impair fertility. Moreover, the use of shaped fillers induces anisotropy in the sealant, which limits mechanical properties of the cured material.

WO 2008/152042 mentions the preparation and use of a phenylorganosiloxane polymer, typically a phenylalkylsiloxane, to formulate a sealant. The replacement of the copolymer used in GB 2,249,552 avoids the presence of by-products such as 2,6-cis-diphenylhexamethylcyclotetrasiloxane and further has been found to reduce the gas permeability of the system without the need for incorporating shaped fillers, to reach a gas permeability comparable to organic sealants. However, the tensile strength and/or the elongation at break of the sealants described in this patent is limited.

WO 2011/051173 mentions the use of 40 to 75 parts by weight of an organic polymer per 100 part of phenylorganosiloxane polymer in a phenylorganosiloxane based composition to improve mechanical properties of the sealant. However, the resulting cured product obtained using this composition shows limited mechanical properties after artificial light (QUV) exposure.

In the present invention there is provided a curable phenylorganosiloxane polymer composition comprising
(a) 100 parts by weight of a phenylorganosiloxane having a viscosity of at least 10000 mPa·s at 25° C. and at least two reactive groups per molecule selected from
(i) —OH or hydrolysable groups and
(ii) unsaturated groups;
(c) 0 to 500 parts by weight of fillers per 100 parts by weight of (a);
(d) a suitable cure package comprising a cross-linker and a catalyst the suitable cure package being selected from
a silane having at least three silicon-bonded hydrolysable groups per molecule or polyorganosiloxane having at least three silicon-bonded hydrolysable groups per molecule and a condensation catalyst when (a) is (a) (i) and
a silane having at least three silicon-bonded hydrogen groups per molecule or polyorganosiloxane having at least three silicon-bonded hydrogen groups per molecule and a hydrosilylation catalyst when (a) is (a) (ii); and
(b) 0.1 to 300 parts by weight of at least one phenyl siloxane resin per 100 parts by weight of (a) in which,
when (a) is (a) (i) the at least one phenyl siloxane resin is un-reactive with said cross-linker in (d) or has at least two —OH groups or hydrolysable groups and
when (a) is (a) (ii) the at least one phenyl siloxane resin is un-reactive with said cross-linker in (d) or has at least 2 unsaturated groups.

Unless otherwise indicated all viscosity measurements are taken at 25° C. using a recording Brookfield viscometer according to ASTM D4287-00(2010). Molecular weight values are number average molecular weight values unless otherwise indicated and are determined via gel permeation chromatography using polystyrene standards When component (a) is (a) (i) the composition is a moisture curable composition. When component (a) is (a) (ii) the composition is an addition (hydrosilylation) curable composition. However, irrespective of the chosen chemistry the result of the curing process should involve the in-situ coupling of components (a) and (b) via a cure process in conjunction with component (d).

The phenylorganosiloxane (a) is typically a phenylalkylsiloxane having a viscosity of at least 10,000 mPa·s at 25° C. alternatively 10,000 mPa to 200,000 mPa at 25° C., alternatively, 40,000 to 120,000 mPa·s at 25° C. and at least two reactive groups per molecule selected from
(i) —OH or hydrolysable groups and
(ii) unsaturated groups.

The phenylorganosiloxane (a) as hereinbefore described is linear or branched in structure but is not a resin (as defined below), alternatively phenylorganosiloxane (a) is linear.

The phenylorganosiloxane as hereinbefore described as component (a) (i) may be a linear phenylorganosiloxane having the structure:

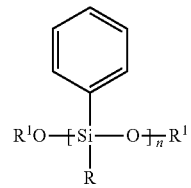

where each R may be the same or different and may comprise a hydrocarbyl group having from 1 to 18 carbon atoms, alternatively an alkyl group having 1 to 12 carbon atoms, alternatively an alkyl group having 1 to 6 carbon atoms, alternatively a methyl or an ethyl group, alternatively a methyl group; a substituted hydrocarbyl group having from 1 to 18 carbon atoms or a hydrocarbonoxy group having from 1 to 18 carbon atoms alternatively an alkoxy group having from 1 to 12 carbon atoms, alternatively an alkoxy group having from 1 to 6 carbon atoms, alternatively a methoxy or ethoxy group, alternatively a methoxy group, alternatively an aryl group, n is a whole number of a size such that the viscosity thereof is in accordance with the invention i.e. above 35, alternatively between 100 and 200, alternatively between 120 and 150 and each $R^1$ is hydrogen, an alkyl group having from 1 to 6 carbon atoms or a terminal group of the formula:

in which each $R^2$ may be the same or different and is selected, in the case of (a)(i), from an alkyl group having from 1 to 6 carbon atoms, —OH, an alkoxy group having from 1 to 6 carbon atoms, an acetoxy group, an enoxy group or an oximo group. Hence, $R^1$ may include, for example, the following terminal groups: —Si(OH)$_3$, —(R$^a$)Si(OH)$_2$, —(R$^a$)$_2$Si(OH), —R$^a$Si(OR$^b$)$_2$, —Si(OR$^b$)$_3$, —R$^a{}_2$Si(OR)$^b$ or —(R$^a$)$_2$Si—R$^c$—SiR$^d{}_p$(OR$^b$)$_{3-p}$ where each R$^a$ independently represents a monovalent hydrocarbyl group, for example, an alkyl group having from 1 to 8 carbon atoms such as a methyl or ethyl group or an aryl group such as phenyl groups substituted phenyl groups, tolyl and naphthyl groups; each $R^b$ group is independently an alkyl group in which the alkyl groups suitably have from 1 to 6 carbon atoms and each $R^d$ is $R^b$ or an aryl group such as phenyl groups substituted phenyl groups, tolyl and naphthyl groups; $R^c$ is a divalent hydrocarbon group which may be interrupted by one or more siloxane spacers having up to six silicon atoms; and p has the value 0, 1 or 2. As hereinbefore discussed polymers (a) (i) must contain at least two hydrolysable or —OH groups per molecule. Whilst these may be R or $R^2$ groups, alternatively each $R^1$ in (a) (i) contains at least one $R^2$ group selected from —OH, an alkoxy group having from 1 to 6 carbon atoms, an acetoxy group or an oximo group with —OH being preferred.

For the purpose of the description herein "Substituted" means one or more hydrogen atoms in a hydrocarbon group has been formally replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Particularly preferred examples of groups R include methyl, ethyl, propyl, butyl, vinyl, cyclohexyl, phenyl, tolyl group, a propyl group substituted with chlorine or fluorine such as 3,3,3-trifluoropropyl, chlorophenyl, beta-(perfluorobutyl)ethyl or chlorocyclohexyl group. Alternatively, at least some and alternatively substantially all of the groups R are methyl. Some R groups may be hydrogen groups. Alternatively the phenylorganosiloxane is a phenylalkylsiloxane. Alternatively each alkyl group may be the same or is different and comprises from 1 to 6 carbon atoms.

The phenylalkylsiloxane, as hereinbefore described may be prepared in accordance with the process described in WO 2008/152042 in which substantially pure higher molecular weight (MW) phenylalkylsiloxane is prepared from a lower MW phenylalkylsiloxane by polymerisation of the lower MW phenylalkylsiloxane under vacuum in the presence of an aqueous alkaline solution containing one or more alkalis selected from the group of sodium hydroxide, potassium hydroxide, magnesium hydroxide, calcium hydroxide, rubidium hydroxide, ammonium hydroxide, tetraalkylammonium hydroxide, tetraalkyl ammonium alkoxide and phosphonium hydroxides in an amount of from 50 ppm to 100,000 ppm, alternatively 50 to 50,000 ppm or alternatively 50 to 25,000 ppm in each instance based upon the amount of lower MW phenylalkylsiloxane.

The phenylorganosiloxane as hereinbefore described as component (a) (ii) may be a linear phenylorganosiloxane having the structure:

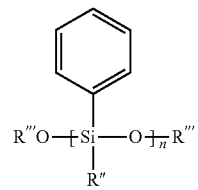

providing it contains at least 2 unsaturated groups per molecule, where each R'" may be the same or different and may comprise a hydrocarbon group having from 1 to 18 carbon atoms as herein described with respect to R above, a substituted hydrocarbon group having from 1 to 18 carbon atoms or an unsaturated group having from 2 to 18 carbon atoms alternatively an alkenyl group having from 1 to 12 carbon atoms, alternatively an alkenyl group having from 1 to 6 carbon atoms, alternatively a vinyl or hexenyl group, alternatively a vinyl group, n is a whole number of a size such that the viscosity thereof is in accordance with the invention i.e. above 35, alternatively above 38, alternatively between 100 and 200, alternatively between 120 and 150 and each $R^1$ is hydrogen, an alkyl group having from 1 to 6 carbon atoms or a terminal group of the formula and each R'" is a terminal group of the formula:

In which each $R^{2'}$ may be the same or different and is selected, from an alkyl group having from 1 to 6 carbon atoms an aryl group or a suitable unsaturated group. Suitable unsaturated groups include alkenyl groups having from 2 to 10 carbon atoms e.g. ethenyl, propenyl, allyl (CH$_2$=CHCH$_2$—)) or they may be acrylic or alkylacrylic such as CH$_2$=C(CH$_3$)—CH$_2$— groups. Representative, non-limiting examples of the alkenyl groups are shown by the following structures; H$_2$C=CH—, H$_2$C=CHCH$_2$—, H$_2$C=C(CH$_3$)CH$_2$—, H$_2$C=CHCH$_2$CH$_2$—, H$_2$C=CHCH$_2$CH$_2$CH$_2$—, and H$_2$C=CHCH$_2$CH$_2$CH$_2$CH$_2$—. Representative, non-limiting examples of alkynyl groups are shown by the following structures; HC≡G, HC≡CCH$_2$—, HC≡CC(CH$_3$)—, HC≡CC(CH$_3$)$_2$— and HC≡CC(CH$_3$)$_2$CH$_2$—. Alternatively, the unsaturated organic group can be an organofunctional hydrocarbon such as an acrylate, methacrylate. Alkenyl groups, e.g. vinyl groups are particularly preferred. Each polymer (a) (ii) must contain at least two unsaturated groups as hereinbefore described which may be R or $R^2$ groups or alternatively each $R^1$ group in (a) (ii) must contain at least one unsaturated group.

Component (b) is 0.1 to 300 parts by weight of at least one phenyl siloxane resin per 100 parts by weight of (a) in which, when (a) is (a) (i) the at least one phenyl siloxane resin is un-reactive with said cross-linker in (d) or has at least two —OH groups or hydrolysable groups and when (a) is (a) (ii) the at least one phenyl siloxane resin is un-reactive with said cross-linker in (d) or has at least 2 unsaturated groups.

As used herein "phenyl silicone resins" refer to organopolysiloxanes containing T or Q siloxy units and the organo groups are at least partially phenyl groups. "Resin" organopolysiloxanes generally result when a portion of the siloxy units used to prepare the organopolysiloxane are selected from $(RSiO_{3/2})$, or $(SiO_{4/2})$ siloxy units. The phenyl silicone resins are polymers containing siloxy units independently selected from $(R_3SiO_{1/2})$, $(R_2SiO_{2/2})$, $(RSiO_{3/2})$, or $(SiO_{4/2})$ siloxy units, where R may be any organic group e.g phenyl groups or hydrogen. These siloxy units are commonly referred to as M, D, T, and Q units respectively. "Resin" organopolysiloxanes generally result when a portion of the siloxy units used to prepare the organopolysiloxane are selected from T or Q siloxy units.

It has been found that in one alternative the phenyl siloxane resin of component (b) is un-reactive with component (d) and is in such circumstances effectively trapped within the network formed upon cure of the composition. Alternatively the at least one phenyl siloxane resin is a resinous polymeric material comprising branching units selected from T units and/or Q units, in which at least 30%, alternatively at least 50%, alternatively at least 60%, alternatively at least 75%, alternatively at least 90%, alternatively 100% of the groups $R^3$, which can be different in different siloxane units, are aryl groups. Aryl groups include phenyl groups substituted phenyl groups, tolyl and naphthyl groups.

When component (a) is (a)(i), the $R^3$ groups which are not aryl groups, are selected from hydroxyl, alkyl, substituted alkyl, alkoxy and substituted alkoxy groups and in one alternative are not reactive with component (d) or in another alternative include at least two —OH groups or hydrolysable groups per molecule when (a) is (a)(i). The phenyl siloxane resin optionally also comprises $R^3{}_2SiO_{2/2}$ units (D units) and/or $R^3{}_3SiO_{1/2}$ units (M units), in which each $R^3$ is defined as above. There may be a mixture of D units present per molecule, for examples in some D units both $R^3$ groups will be alkyl groups, e.g. methyl or ethyl groups, and in other D units in the same molecule one $R^3$ group is an aryl group and the other is an alkyl group. The alkyl and alkoxy groups present in the phenyl siloxane resin each contain 1 to 20, alternatively 1 to 8, carbon atoms. When $R^3$ represents an alkyl or substituted alkyl group, examples of the preferred alkyl groups $R^3$ include methyl, ethyl, n-propyl, isopropyl, n-butyl, isobutyl, hexyl, cyclohexyl, 2-ethylhexyl and octyl. Examples of substituted alkyl groups are any of the above alkyl groups substituted as hereinbefore defined. The hydrolysable groups per molecule when (a) is (a)(i). are typically alkoxy groups having 1 to 12 carbon atoms, alternatively alkoxy groups having 1 to 6 carbon atoms, alternatively methoxy or ethoxy groups, alternatively methoxy groups. The phenyl siloxane resin is 3-dimensional. It is distinguished from a 2-dimensional "ladder" structure.

In one alternative the phenyl siloxane resin when component (a) is (a) (i) is a T-resin in which the majority of the siloxane units are T units. Alternatively, at least 80 or 90% of the siloxane units in the T-resin are T units. Such T-resins can readily be prepared by hydrolysis and condensation of trichlorosilanes and separated from the reaction mixture by transferring to an organic phase from an aqueous phase. The T-resins can alternatively be prepared by hydrolysis and condensation of trialkoxysilanes such as triethoxysilanes. The T-resins are more readily available and less expensive than polyhedral oligomeric silsesquioxanes, which have to be prepared slowly in dilute conditions favouring intramolecular condensation over intermolecular condensation. The hydrocarbon groups in the T units of the phenyl siloxane resin are selected from phenyl groups and alkyl groups having 1 to 8 carbon atoms, for example phenyl groups and methyl propyl or octyl groups respectively but if required includes at least two —OH or hydrolysable groups per molecule.

The T-resin may comprise units of the formula $R^3SiO_{3/2}$, in which each $R^3$ represents an aryl group, and units of the formula $R^4R^3SiO_{2/2}$ in which $R^3$ groups are as hereinbefore described and $R^4$ groups are hydroxyl groups or alkoxy groups. Some or all of the aryl groups can be substituted, for example by a reactive group as described above with reference to substituted alkyl groups.

When component (a) is (a)(i) The phenyl siloxane resin can alternatively be a DT resin comprising T units as described above and D units of the formula $R^5{}_2SiO_{2/2}$, for example 20 to 80 mole %, alternatively 50 to 80% T units and 20 to 80%, alternatively 20 to 50%, D units of the formula $R^5{}_2SiO_{2/2}$, where each $R^5$ may be the same or different and represents a hydrocarbon group containing 1 to 8, alternatively 1 to 4, carbon atoms, particularly methyl but where required must include at least two —OH or hydrolysable groups per molecule.

When component (a) is (a) (i) More than one type of phenyl siloxane resin can be used in the compositions as hereinbefore described. For example a T-resin or DT-resin as described above can be used in conjunction with a resin containing Q groups but where required must include at least two —OH or hydrolysable groups per molecule.

In one alternative when component (a) is (a)(i) the phenyl siloxane resin should have no more than one OH group or alkoxy group bonded to any silicon atom. The resin can in general have a hydroxyl/alkoxy content of 1 to 22% by weight OH and/or alkoxy groups bonded to silicon, calculated as the weight of such OH/alkoxy groups per weight resin. A phenyl T-resin consisting of silicone units of the formula $(HOR''SiO_{2/2})$ has 12.3% by weight OH groups bonded to silicon. Alternatively, the phenyl siloxane resin has a hydroxyl content of at least 3% by weight up to about 10% by weight. Most alternatively the phenyl siloxane resin has a hydroxyl content of 5 to 8% by weight OH groups bonded to silicon. The siloxane resin may contain OH or hydrolysable to OH groups (as alkoxy for example) bonded to the Si atoms. Typically, 0.5 to 20% (mole) of the Si atoms may bear OH or hydrolysable groups.

The phenyl siloxane resin can be a solid or a liquid. It can for example be added to the rubber composition in solid form such as powder, flakes or pellets or carried on a substrate or in liquid form such as a pure liquid or a solution.

When Component (b) is at least one phenyl siloxane resin having at least 2 unsaturated groups when component (a) is (a) ii component (b) will have at least 50% alternatively at least 70%, alternatively 100% of the hydroxyl groups or hydrolysable groups replaced by the unsaturated groups as hereinbefore described in respect of component (a) (ii).

In one embodiment of the present invention either component (a) or component (b) has a relatively low viscosity (i.e. low molecular weight) which upon curing will result in the preparation of a high modulus sealant.

Compositions in accordance with the present invention may contain one or more finely divided, reinforcing fillers (c) such as high surface area fumed and precipitated silicas, calcium carbonate or additional non-reinforcing fillers such as crushed quartz, diatomaceous earths, barium sulphate, iron oxide, titanium dioxide carbon black, talc and/or wollastonite.

Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Further alternative fillers include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other sealant components. The surface treatment of the fillers makes the ground silicate minerals easily wetted by the silicone polymer. These surface modified fillers do not clump, and can be homogeneously incorporated into the silicone polymer. This results in improved room temperature mechanical properties of the uncured compositions. Furthermore, the surface treated fillers give a lower conductivity than untreated or raw material.

Usually the filler content of the composition will reside within the range from about 5 to about 500 parts by weight per 100 parts by weight of the polymer (a). A range of from 50 to 400 parts by weight per 100 parts by weight of the polymer (a) is preferred.

The proportion of such fillers when employed will depend on the properties desired in the elastomer-forming composition and the cured elastomer for example when fillers are provided in the composition in amounts approaching the top of the range properties such as gas permeability will be reduced.

Cure package (d) comprises a cross-linker and a catalyst, the cure package is selected from:
a silane or polyorganosiloxane having at least three silicon-bonded hydrolysable groups and a condensation catalyst when (a) is (a) (i) and
a silane or polyorganosiloxane having at least three silicon-bonded hydrogen groups per molecule and a hydrosilylation catalyst when (a) is (a) (ii).

When (a) is (a) i the cross-linker in the cure package comprises a silane or polyorganosiloxane having at least three silicon-bonded hydrolysable groups A suitable cross-linker (d) when (a) and (b) contain —OH or hydrolysable terminal groups may contain three silicon-bonded hydrolysable groups per molecule; the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Alternatively however, the fourth silicon-bonded organic group is methyl or ethyl.

Specific examples of cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo)silane, methyltris(methylethylketoximino)silane, methyltris(isopropenoxy)silane, vinyltris(isopropenoxy)silane, ethylpolysilicate, n-propylorthosilicate, ethylorthosilicate and dimethyltetraacetoxydisiloxane.

The cross-linker when (a) and (b) contain —OH terminal groups may also comprise a disilaalkane of the formula:

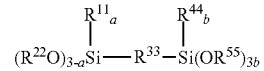

where $R^{11}$ and $R^{44}$ are monovalent hydrocarbons, $R^{22}$ and $R^{55}$ are alkyl groups or alkoxylated alkyl groups, $R^{33}$ is a divalent hydrocarbon group and a and b are 0 or 1. Specific examples include 1,6-bis(trimethoxysilyl)hexane, 1,1-bis(trimethoxysilyl)ethane, 1,2-bis(trimethoxysilyl)ethane, 1,2-bis(trimethoxysilyl)propane, 1,1-bis(methyldimethoxysilyl)ethane, 1,2-bis(triethoxysilyl)ethane, 1-trimethoxysilyl-2-methyldimethoxysilylethane, 1,3-bis(trimethoxyethoxysilyl)propane, and 1-dimethylmethoxysilyl-2-phenyldiethoxysilylethane.

Further alternative cross-linkers include Alkylalkenylbis(N-alkylacetamido) silanes such as methylvinyldi-(N-methylacetamido)silane, and methylvinyldi-(N-ethylacetamido)silane; dialkylbis(N-arylacetamido) silanes such as dimethyldi-(N-methylacetamido)silane; and dimethyldi-(N-ethylacetamido)silane; Alkylalkenylbis(N-arylacetamido) silanes such as methylvinyldi(N-phenylacetamido)silane and dialkylbis(N-arylacetamido) silanes such as dimethyldi-(N-phenylacetamido)silane. The cross-linker used may also comprise any combination of two or more of the above. A particularly preferred cross-linker is 1,6-bis(trimethoxysilyl)hexane.

When (a) is (a) (i), the cross-linker used may also comprise any combination of two or more of the above. The condensation cross-linkers are present in the composition in a range of about 0.1 to 10% by weight of the composition.

In cases where resin (b) is a solid e.g. a flaked resin, It has been found that such flake resins can be pre-dispersed and/or pre-dissolved in the cross-linker and/or any liquid in order to ease their incorporation in any parts of the sealant.

When (a) is (a) (i), the catalyst is any suitable condensation catalyst (d) may be utilised to cure the composition these include condensation catalysts including tin, lead, antimony, iron, cadmium, barium, manganese, zinc, chromium, cobalt, nickel, aluminium, gallium or germanium and zirconium. Examples include organic tin metal catalysts such as triethyltin tartrate, tin octoate, tin oleate, tin naphthate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate Dibutyltin dibenzoate, stannous octoate, dimethyltin dineodeconoate, dibutyltin dioctoate of which stannous octoates is particularly preferred. Other examples include 2-ethylhexoates of iron, cobalt, manganese, lead and zinc. In the case when a tin (II) catalyst like for example tin octoate is used the catalyst might be used at levels of about 0.5 to 5 wt %, alternatively 0.75 to 2 wt %, alternatively 1 to 1.5 wt % of the sealant are to be considered. In the case when a tin (IV) catalyst is utilised the amount of catalyst used is typically in the range of 0.1 to 1 wt % of the composition Alternative condensation catalysts include titanate or zirconate compounds. Such titanates may comprise a compound according to the general formula $Ti[OR]_4$ where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Alternatively, when each R is the same, R is an unbranched secondary alkyl groups, branched secondary alkyl group or a tertiary alkyl group, in particular, tertiary butyl such as tetrabutyltitanate, tetraisopropyltitanate.

For the avoidance of doubt an unbranched secondary alkyl group is intended to mean a linear organic chain which does not have a subordinate chain containing one or more carbon atoms, i.e. an isopropyl group, whilst a branched secondary alkyl group has a subordinate chain of one or more carbon atoms such as 2,4-dimethyl-3-pentyl.

Any suitable chelated titanates or zirconates may be utilised. Alternatively the chelate group used is a monoketoester such as acetylacetonate and alkylacetoacetonate giving chelated titanates such as, for example diisopropyl bis(acetylacetonyl)titanate, diisopropyl bis(ethylacetoacetonyl)titanate, diisopropoxytitanium bis(ethylacetoacetate) and the like. Examples of suitable catalysts are additionally described in EP1254192 and WO200149774 which are incorporated herein by reference.

In the case when (a) is (a) (ii), the cure process will proceed via a hydrosilylation reaction pathway and hence the cross-linker will typically contain 3 or more silicon bonded hydrogen groups. To effect curing of the present composition, the organohydrogensiloxane must contain more than two silicon bonded hydrogen atoms per molecule. The organohydrogensiloxane can contain, for example, from about 4-200 silicon atoms per molecule, and alternatively from about 4 to 50 silicon atoms per molecule and have a viscosity of up to about 10 Pas at 25° C. The silicon-bonded organic groups present in the organohydrogensiloxane can include substituted and unsubstituted alkyl groups of 1-4 carbon atoms that are otherwise free of ethylenic or acetylenic unsaturation. Alternatively each organohydrogensiloxane molecule comprises at least 3 silicon-bonded hydrogen atoms in an amount which is sufficient to give a molar ratio of Si—H groups in the organohydrogensiloxane to the total amount of alkenyl groups in polymer (a) and resin (b) of from 1/1 to 10/1.

In the case when (a) is (a) (ii), the cure process requires one or more hydrosilylation catalysts. These are typically platinum group metal based catalysts selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is platinum. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes.

The platinum group metal containing catalyst may be added to the present composition in an amount equivalent to as little as 0.001 part by weight of elemental platinum group metal, per one million parts (ppm) of the composition. Alternatively, the concentration of platinum group metal in the composition is capable of providing the equivalent of at least 1 part per million of elemental platinum group metal. A catalyst concentration providing the equivalent of about 3-50 parts per million of elemental platinum group metal is generally the amount preferred.

To obtain a longer working time or "pot life", the activity of hydrosilylation catalysts under ambient conditions can be retarded or suppressed by addition of an optional inhibitor. Known platinum group metal catalyst inhibitors include the acetylenic compounds disclosed in U.S. Pat. No. 3,445,420. Acetylenic alcohols such as 2-methyl-3-butyn-2-ol and 1-ethynyl-2-cyclohexanol constitute a preferred class of inhibitors that suppress the activity of a platinum-based catalyst at 25° C. Compositions containing these catalysts typically require heating at temperatures of 70° C. or above to cure at a practical rate. Room temperature cure is typically accomplished with such systems by use of a two-part system in which the crosslinker and inhibitor are in one of the two parts and the platinum is in the other part. The amount of platinum is increased to allow for curing at room temperature.

The composition in accordance with the present invention provides the user with formulations suitable for applications including, sealants formulations.

Other ingredients which may be included in the compositions include but are not restricted to adhesion promoters, pigments, UV stabilizers, fungicides and/or biocides and the like (which may suitably be present in an amount of from 0 to 0.3% by weight), water scavengers, (typically the same compounds as those used as cross-linkers or silazanes). It will be appreciated that some of the additives are included in more than one list of additives. Such additives would then have the ability to function in all the different ways referred to.

A suitable plasticiser or extender may also be utilised in the sealant composition in accordance with the present invention. A plasticiser (sometimes referred to as a primary plasticiser) may be added to a polymer composition to provide properties within the final polymer based product e.g. to increase the flexibility and toughness of the final polymer composition.

Typically, for silicone based compositions plasticisers are organopolysiloxanes which are un-reactive with the siloxane polymer of the composition, such as polymethylphenylsiloxane having terminal triorganosiloxy groups wherein the organic substituents are, for example, methyl, vinyl or phenyl or combinations of these groups. Such polymethylphenylsiloxanes normally have a viscosity of from about 5 to about 100,000 mPa·s at 25° C. Compatible organic plasticisers may additionally be used, examples include dialkyl phthalates wherein the alkyl group may be linear and/or branched and contains from six to 20 carbon atoms such as dioctyl, dihexyl, dinonyl, didecyl, diallanyl and other phthalates; adipate, azelate, oleate and sebacate esters, polyols such as ethylene glycol and its derivatives, organic phosphates such as tricresyl phosphate and/or triphenyl phosphates.

Typically plasticisers are more compatible with polymer compositions than extenders and tend to be significantly less volatile and as such are significantly more likely to remain at high levels within the polymer matrix after curing.

Extenders need to be both sufficiently compatible with the remainder of the composition and as non-volatile as possible at the temperature at which the resulting cured elastomeric solid is to be maintained (e.g. room temperature).

A wide variety of organic compounds and compositions have been proposed for use as extenders for reducing the cost of the silicone sealant compositions. Whilst polyalkylbenzenes such as heavy alkylates (alkylated aromatic materials remaining after distillation of oil in a refinery) have been proposed as extender materials for silicone sealant compositions in recent years, the industry has increasingly used mineral oil based (typically petroleum based) paraffinic hydrocarbons as extenders as reviewed GB 2424898 the content of which is enclosed herein by reference.

Any suitable one or more plasticiser(s) and/or extender(s), e.g. those discussed in GB 2424898 may be utilised providing they are compatible with both (a) and (b) in the composition in accordance with the invention in order to aid compatibilisation thereof in the cured composition leading to improved mechanical properties. The plasticiser(s) and/or extender(s) may be present in an amount of 0 to 100 parts by weight per 100 parts by weight of component (a), alternatively in an amount of 0 to 40 parts by weight per 100 parts by weight of component (a) and in a further alternative 0.1 to 40 parts by weight per 100 parts by weight of component (a).

Any suitable adhesion promoter(s) may be incorporated in a sealant composition in accordance with the present invention. These may include for example alkoxy silanes such as aminoalkylalkoxy silanes, epoxyalkylalkoxy silanes, for example, 3-glycidoxypropyltrimethoxysilane and, mercapto-alkylalkoxy silanes and γ-aminopropyl triethoxysilane, reaction products of ethylenediamine with silylacrylates. Isocyanurates containing silicon groups such as 1,3,5-tris(trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

In one embodiment there is provided a sealant composition comprising, in addition to components (a) i and (b) component (c) 0 to 85% by weight of an inorganic filler or a mixture of inorganic fillers such as calcium carbonate, silica, aluminum oxide, mica or calcined kaolin, which fillers may have been hydrophobically treated, and a cure package (d) consisting of 0.1 to 10% of a crosslinker 0.01% to 5% of an adhesion promoter, and 0.01 to 5% of a catalyst based on tin, titanium, aluminum, zirconium, or bismuth, together with
0.01% to 5% of an adhesion promoter,
0 to 40% by weight of one or more plasticizers and/or one or more extenders, such as a mineral oil, or a low MW trialkylsilyl terminated polysiloxane, 0 to 10% of a rheological additive, 0.1 to 10% of a crosslinker 0.01% to 5% of an adhesion promoter with the total cumulative weight of the ingredients in any such combination being 100% by weight of the composition.

A further embodiment is the use of the phenylorganosiloxane composition as hereinbefore described as a sealant. Furthermore there is provided a method of sealing a space between two surfaces, said method comprising applying a composition as described herein into a space between two surfaces and causing or allowing the composition to cure. There is also provided a glazing structure or building unit which includes a sealant as hereinbefore described. The formulations described in the present invention are especially useful in sealants, particularly in sealants for insulating glass units (IGUs), due to their low gas permeability, a property which may also be useful in other applications, such as conformal coatings and corrosion protection. Such formulations can also be used in a variety of other applications, for example in applications where their resistance to high temperature is beneficial such as, for instance as an adhesive, a sealant, an encapsulant or a coating for mechanical, electrical or electronic parts for automotive, aerospace, solar etc. Due to the high refractive index of phenylmethylsiloxane fluids, the formulated products can be used for optical adhesives, sealants and coatings. Due to their shiny appearance they can also be used for formulating lotions to be used in personal care products for hair and skin. Their properties can also be useful for coatings to treat metals, textiles and paper.

Elastomers prepared from compositions as hereinbefore described were surprisingly found to give significantly better physical property results when compared with prior art compositions particularly when compared therewith after exposure ultra violet light.

The composition in accordance with the present invention may be stored as a one part composition or, alternatively may be provided in two or more parts, two parts being preferred (in the latter case they are combined immediately prior to use). Typically such multiple part compositions can have any suitable combination providing that neither part is able to pre-cure prior to mixing. For example, polymer, and filler may be present in a first part and the crosslinker, adhesion promoter (when present) and catalyst may be in the second part. In such cases resin(s) (b) may be retained in both the first part and the second part and in one embodiment one resin (b) is present in the first part and a second resin (b) is present in the second part of the composition. Optional additives may be present in either part. When the composition is stored in two parts the two parts of the composition need to be mixed prior to application.

The present invention will now be described in detail by way of the following Examples in which all viscosity measurements were taken at 25° C. using a recording Brookfield viscometer according to ASTM D4287-00(2010) unless otherwise indicated. Molecular weight of the resins described was measured by gel permeation chromatography calculated on the basis of polystyrene molecular weight equivalents. OH terminated polyphenylmethylsiloxane polymers produced in the lab according to the method described in WO2008/152042 (the content of which is hereby incorporated by reference), namely by polymerisation of a "lower" molecular weight (MW) phenylalkylsiloxane under vacuum in the presence of an aqueous alkaline solution containing one or more alkalis selected from the group of sodium hydroxide, potassium hydroxide, magnesium hydroxide, calcium hydroxide, rubidium hydroxide ammonium hydroxide, tetraalkylammonium hydroxide, tetraalkyl ammonium alkoxide and phosphonium hydroxides in an amount of from 50 ppm or greater based upon the amount of lower MW phenylalkylsiloxane.

EXAMPLES

Two phenyl siloxane T resins were utilised in the Examples as component (b): —
Resin 1 was a silicone T resin having an average ratio of phenyl to methyl groups of 1:1, an average weight average molecular weight of 1000 to 1500 grams per mole (gel permeation chromatography using polystyrene standards) and a 15-18% by weight methoxy group content; and
Resin 2 was a silicone T-resin containing phenyl groups, with a hydroxyl content of 6 to 8% by weight and weight average molecular weight Mw 2660 g/mol (gel permeation chromatography using polystyrene standards).

Example 1

116.7 g of an OH terminated polyphenylmethylsiloxane (a)(i) having a number average molecular weight of ca 25,000 (Polymer 25,000) and 31.4 g of Resin 1 were incorporated into a speedmixer and mixed for 1 minute at room temperature. Thereafter, 58.4 g of a fatty acid treated ground calcium carbonate sold under the Trade name Mickart® AC supplied by La Provencale was added and mixed for 1 minute at room temperature. 93.4 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 3.339 g of 1,6-bis(trimethoxysilyl)hexane, 1.662 g of 3-aminopropyltriethoxysilane, 0.420 g of [3-(2-aminoethyl)aminopropyl]trimethoxysilane and 2.498 g of stannous octoate were added and mixed for 1 minute to give a curable phenylorganosiloxane composition of Ex. 1. The composition was then filled in a cartridge and applied onto glass for testing as hereinbefore described.

Example 2

125 g of an OH terminated polyphenylmethylsiloxane (a)(i) having a number average molecular weight of ca 25,000 and 12.5 g of Resin 1 were incorporated into a speedmixer and mixed for 1 minute at room temperature. Thereafter, 62.5 g of a fatty acid treated ground calcium carbonate sold under the Trade name Mickart® AC supplied by La Provencale was added and mixed for 1 minute at room temperature. 100.0 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 3.575 g of 1,6-bis(trimethoxysilyl)hexane, 21.250 g of Resin 1, 1.788 g of 3-aminopropyltriethoxysilane, 0.450 g of [3-(2-aminoethyl)aminopropyl]trimethoxysilane and 2.675 g of stannous octoate were added and mixed for 1 minute to give a curable phenylorganosiloxane composition of Ex. 2. The composition was then filled in a cartridge and applied onto glass for testing as hereinbefore described.

Example 3

116.7 g of an OH terminated polyphenylmethylsiloxane (a)(i) having a number average molecular weight of ca 25,000 and 14.2 g of Resin 1 premixed 24 h at room temperature with 17.3 g of Resin 2 were incorporated into a speedmixer and mixed for 1 minute at room temperature. Thereafter, 58.4 g of a fatty acid treated ground calcium carbonate sold under the Trade name Mickart® AC supplied by La Provencale was added and mixed for 1 minute at room temperature. 93.4 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 3.339 g of 1,6-bis(trimethoxysilyl)hexane, 1.662 g of 3-aminopropyltriethoxysilane, 0.420 g of [3-(2-aminoethyl)aminopropyl]trimethoxysilane and 2.498 g of stannous octoate were added and mixed for 1 minute to give a curable phenylorganosiloxane composition of Ex. 3. The composition was then filled in a cartridge and applied onto glass for testing as hereinbefore described.

Example 4

122.4 g of an OH terminated polyphenylmethylsiloxane (a)(i) having a number average molecular weight of ca 20,000 (Polymer 20,000) and 22.0 g of Resin 1 premixed 24 h at room temperature with 26.9 g of Resin 2 were incorporated into a speedmixer and mixed for 1 minute at room temperature. Thereafter, 30.6 g of a fatty acid treated ground calcium carbonate sold under the Trade name Mickart® AC supplied by La Provencale was added and mixed for 1 minute at room temperature. 98.0 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 2.449 g of 1,6-bis(trimethoxysilyl)hexane, 1.224 g of 3-aminopropyltriethoxysilane, 0.306 g of [3-(2-aminoethyl)aminopropyl]trimethoxysilane and 3.673 g of stannous octoate were added and mixed for 1 minute to give a curable phenylorganosiloxane composition of Ex. 4. The composition was then filled in a cartridge and applied onto glass for testing as hereinbefore described.

Example 5

122.4 g of an OH terminated polyphenylmethylsiloxane (a)(i) of having a number average molecular weight of ca 20,000 and 22.0 g of Resin 1 premixed 24 h at room temperature with 26.9 g of Resin 2 were incorporated into a speedmixer and mixed for 1 minute at room temperature. Thereafter, 30.6 g of a fatty acid treated ground calcium carbonate sold under the Trade name Mickart® AC supplied by La Provencale was added and mixed for 1 minute at room temperature. 98.0 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 20.816 g of a fatty acid treated ground calcium carbonate sold under the Trade name Mickart® AC supplied by La Provencale, 2.449 g of 1,6-bis(trimethoxysilyl)hexane, 1.224 g of 3-aminopropyltriethoxysilane, 0.306 g of [3-(2-aminoethyl)aminopropyl]trimethoxysilane and 3.673 g of stannous octoate were added and mixed for 1 minute to give a curable phenylorganosiloxane composition of Ex. 5. The composition was then filled in a cartridge and applied onto glass for testing as hereinbefore described.

Example 6

133.3 g of an OH terminated polyphenylmethylsiloxane (a)(i) having a number average molecular weight of ca 20,000, and 13.3 g of n-propyl orthosilicate premixed 24 h at room temperature with 13.3 g of Resin 2 were incorporated into a speedmixer and mixed for 1 minute at room temperature. Thereafter, 33.3 g of a fatty acid treated ground calcium carbonate sold under the Trade name Mickart® AC supplied by La Provencale was added and mixed for 1 minute at room temperature. 106.7 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 1.333 of carbon black, 1.333 g of 3-aminopropyltriethoxysilane and 4.000 g of stannous octoate were added and mixed for 1 minute to give a curable phenylorganosiloxane composition of Ex. 6. The composition was then filled in a cartridge and applied onto glass for testing as hereinbefore described.

Comparative Example 1

130.0 g of an OH terminated polyphenylmethylsiloxane (a)(i) having a number average molecular weight of ca 25,000 and 65.2 g of a fatty acid treated ground calcium carbonate sold under the Trade name Mickart® AC supplied by La Provencale was added and mixed for 1 minute at room temperature in a speedmixer. 104.3 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 3.730 g of 1,6-bis(trimethoxysilyl)hexane, 1.865 g of 3-aminopropyltriethoxysilane, 0.470 g of [3-(2-aminoethyl)aminopropyl]trimethoxysilane and 2.791 g of stannous octoate were added and mixed for 1 minute to give a curable phenylorganosiloxane composition of comparative example 1. The composition was then filled in a cartridge and applied onto glass for testing as hereinbefore described.

Comparative Example 2

146.0 g of an OH terminated polyphenylmethylsiloxane (a)(i) having a number average molecular weight of ca 20,000 and 36.6 g of a fatty acid treated ground calcium carbonate sold under the Trade name Mickart® AC supplied by La Provencale was added and mixed for 1 minute at room temperature in a speedmixer. 117.1 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 2.927 g of 1,6-bis(trimethoxysilyl)hexane, 1.463 g of 3-aminopropyltriethoxysilane, 0.366 g of [3-(2-aminoethyl)aminopropyl]trimethoxysilane and 4.390 g of stannous octoate were added and mixed for 1 minute to give a curable phenylorganosiloxane composition of comparative example 2. The composition was then filled in a cartridge and applied onto glass for testing as hereinbefore described.

Comparative Example 3

116.7 g of an OH terminated polyphenylmethylsiloxane (a)(i) having a number average molecular weight of ca 25,000 and 31.5 g of a trimethoxysilyl terminated polypropyleneoxide polymer (Bayer Desmoseal® S XP 2636 referred to in Table 1 as "Silyl terminated polyurethane") were incorporated into a speedmixer and mixed for 1 minute at room temperature. Then 58.4 g of a fatty acid treated ground calcium carbonate sold under the Trade name Mickart® AC supplied by La Provencale was added and mixed for 1 minute at room temperature. 93.4 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 3.339 g of 1,6-bis(trimethoxysilyl)hexane, 1.669 g of 3-aminopropyltriethoxysilane, 0.420 g of [3-(2-aminoethyl)aminopropyl]trimethoxysilane and 2.498 g of stannous octoate were added and mixed for 1 minute to give a curable phenylorganosiloxane composition of comparative example 3. The composition was then filled in a cartridge and applied onto glass for testing as hereinbefore described.

Comparative Example 4

148.2 g of an OH terminated polyphenylmethylsiloxane having a number average molecular weight of ca 25,000 and 58.4 g of a fatty acid treated ground calcium carbonate sold under the Trade name Mickart® AC supplied by La Provencale was added and mixed for 1 minute at room temperature in a speedmixer. 93.4 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 3.339 g of 1,6-bis(trimethoxysilyl)hexane, 1.669 g of 3-aminopropyltriethoxysilane, 0.420 g of [3-(2-aminoethyl)aminopropyl]trimethoxysilane and 3.502 g of stannous octoate were added and mixed for 1 minute to give a curable phenylorganosiloxane composition of comparative example 4. The composition was then filled in a cartridge and applied onto glass for testing as hereinbefore described.

Comparative Example 5

171.4 g of an OH terminated polyphenylmethylsiloxane (a)(i) having a number average molecular weight of ca 25,000 and 30.6 g of a fatty acid treated ground calcium carbonate sold under the Trade name Mickart® AC supplied by La Provencale was added and mixed for 1 minute at room temperature in a speedmixer. 98.0 g of an ultrafine, stearic acid treated precipitated calcium carbonate sold as Socal® 312N supplied by Solvay were then added and mixed for 1 minute at room temperature. A dynamic vacuum was applied for 10 minutes on the mixture. Then 2.449 g of 1,6-bis(trimethoxysilyl)hexane, 1.224 g of 3-aminopropyltriethoxysilane, 0.306 g of [3-(2-aminoethyl)aminopropyl]trimethoxysilane and 2.620 g of stannous octoate were added and mixed for 1 minute to give a curable phenylorganosiloxane composition of comparative example 5. The composition was then filled in a cartridge and applied onto glass for testing as hereinbefore described.

Sample Testing

The compositions prepared as described above were subsequently tested for physical properties and the results are provided in Table 1 below. Standard sized test pieces (hereafter referred to as tensile adhesion joints) were prepared using the following method: —

1) The air side of 2 pieces of float glass (dimensions 75×12×8 mm$^3$ (cubic millimeters)) were identified using a UV lamp and were then cleaned with a mixture of isopropanol (IPA)/acetone in a proportion of 3:1 one hour prior to the application of the sealant (One of the commonest methods of making float glass involves floating molten glass on a bed of molten tin. During the glass making process, a small amount of tin is absorbed by the glass where it's in contact with the tin. This side of the finished glass is referred to as the "tin side". The other side is referred to as the "air side").
2) A tensile adhesion joint (dimensions 50×12×12 mm$^3$) was prepared between the air sides of the said glass using a polytetrafluoroethylene (PTFE) mould by placing the mould on the air side of one of the pieces of glass and then filling the mould with freshly prepared sealant composition, applying the air side of the second glass substrate onto the filled mould, adhering the second piece of glass to the sealant composition in the mould, removing the mould resulting in that the interface surface area between sealant and each glass substrate was 50×12 mm$^2$. The thus sealed tensile pieces were then cured in a climatic chamber for the desired period of time as specified in Table 1 below at room temperature (RT, 23° C.) and 50% relative humidity.
3) Subsequent to curing the resulting cured tensile adhesion joints were tested on a Zwick tensiometer in accordance with the ISO 8339 standard at a deformation speed of 5.5 mm/min (millimeters per minute) until rupture. (The tensile strength is the maximum stress recorded during the testing expressed in MPa (mega Pascals). The elongation is the strain at break of the tensile adhesion joint expressed in %).

The mode of rupture of the tensile adhesion joints from the glass substrate surfaces were recorded as follows:

A failure occurring in the bulk of the sealant is recorded as a cohesive failure (CF);

A failure occurring between the sealant and the substrate leaving no trace of sealant on the substrate was recorded as an adhesive failure (AF); and A failure occurring between the sealant and the substrate but leaving a thin layer of sealant on the substrate was recorded as a boundary failure (BF). The results in Table 1 are provided as an average of 3 values is reported in Table 1 and when present the number following the term CF in said Table represents the percentage of cohesive failure.

Artificial light exposure (referred to as QUV Humid) was carried out on 28 day cured tensile joints on glass (using the above method) using the standard conditions of exposure, as described in ISO 11431:2002, using method A conditioning and automatic cycling. The conditions of test are 1000 h of exposure, made up of 500 cycles. Each cycle is consisting of the following:

a dry period of 102 min, in which the cured tensile joints adhered to the glass substrates are exposed to radiation and heat. Commencing at the start of said dry period the temperature is allowed to rise, until it reaches a steady temperature of 65+/−5° C. after which it is maintained at said steady temperature.

a wet period of 18 min, in which water is sprayed; on the cured tensile joints on glass with the initial water temperature being 25+/−3° C. and not rising above 33° C. during the testing. During the wet period the light is switched off.

As it can be seen from table 1, tensile strength of formulations cured for 28 days are pretty similar between formulations containing or not silicone resins. On one side it can be seen that tensile strength of example 1 to 6 is generally improved after UV exposure. On the other side comparative examples are showing equal to lower mechanical properties after UV exposure in comparison to value obtained after 28 days of cure. Tensile strengths after UV exposure of all formulations containing resins are higher than formulations that do not contain resin

TABLE 1

|  | Ex 1 | Ex 2 | Ex 3 | Ex 4 | Ex 5 | Ex 6 | Comp ex 1 | Comp ex 2 | Comp ex 3 | Comp ex 4 | Comp ex 5 |
|---|---|---|---|---|---|---|---|---|---|---|---|
| Polymer Mn 20,000 |  |  |  | 100 | 100 | 100 |  | 100 |  |  | 140 |
| Polymer Mn 25,000 | 100 | 100 | 100 |  |  |  | 100 |  | 100 | 127 |  |
| Resin 2 |  |  | 14.85 | 22 | 22 | 10 |  |  |  |  |  |
| Silyl terminated polyurethane |  |  |  |  |  |  |  |  |  | 27 |  |
| Resin 1 | 27 | 10 | 12.15 | 18 | 18 |  |  |  |  |  |  |
| Ground calcium carbonate | 50 | 50 | 50 | 25 | 25 | 25 | 50 | 25 | 50 | 50 | 25 |
| Precipitated calcium carbonate | 80 | 80 | 80 | 80 | 80 | 80 | 80 | 80 | 80 | 80 | 80 |
| n-propyl orthosilicate |  |  |  |  |  | 10 |  |  |  |  |  |
| 1,6-bis(trimethoxysilyl)hexane | 2.86 | 2.86 | 2.86 | 2 | 2 |  | 2.86 | 2 | 2.86 | 2.86 | 2 |
| Resin 1 |  | 17 |  |  |  |  |  |  |  |  |  |
| 3-aminopropyltriethoxysilane | 1.43 | 1.43 | 1.43 | 1 | 1 | 1 | 1.43 | 1 | 1.43 | 1.43 | 1 |
| [3-(2-aminoethyl)aminopropyl] trimethoxysilane | 0.36 | 0.36 | 0.36 | 0.25 | 0.25 |  | 0.36 | 0.25 | 0.36 | 0.36 | 0.25 |
| Stannous Octoate | 2.14 | 2.14 | 2.14 | 3 | 3 | 3 | 2.14 | 3 | 2.14 | 3 | 2.14 |
| Ground calcium carbonate |  |  |  |  | 17 |  |  |  |  |  |  |
| Carbon black |  |  |  |  |  | 1 |  |  |  |  |  |
| HP Glass 28 days RT cure |  |  |  |  |  |  |  |  |  |  |  |
| break comment (AF-BF-CF) | BF | BF | BF | CF | CF | 50CF | 70CF | 50CF | CF | CF | CF |
| Tensile Strength (MPa) | 0.89 | 0.92 | 0.78 | 0.96 | 0.75 | 0.63 | 0.85 | 0.72 | 1.01 | 0.79 | 0.77 |
| Elongation at break (%) | 26 | 22 | 29 | 27 | 26 | 36 | 14 | 22 | 46 | 25 | 52 |
| HP Glass 28 days RT cure + 1000 h QUV Humid exposure |  |  |  |  |  |  |  |  |  |  |  |
| break comment (AF-BF-CF) | BF | 10CF | BF | BF | CF | BF | BF | BF | BF | BF | 80CF |

TABLE 1-continued

| | Ex 1 | Ex 2 | Ex 3 | Ex 4 | Ex 5 | Ex 6 | Comp ex 1 | Comp ex 2 | Comp ex 3 | Comp ex 4 | Comp ex 5 |
|---|---|---|---|---|---|---|---|---|---|---|---|
| Tensile Strength (MPa) | 1.12 | 1.15 | 0.93 | 1.42 | 1.42 | 0.93 | 0.88 | 0.71 | 0.33 | 0.61 | 0.66 |
| Elongation at break (%) | 12 | 12 | 16 | 17 | 16 | 26 | 14 | 19 | 22 | 20 | 39 |

The invention claimed is:

1. A curable phenylorganosiloxane polymer composition comprising:
   (a) 100 parts by weight of a phenylorganosiloxane having a viscosity of at least 10000 mPa·s at 25° C. and at least two reactive groups per molecule selected from —OH or hydrolysable groups;
   (c) 0 to 500 parts by weight of fillers per 100 parts by weight of (a);
   (d) a suitable cure package comprising a cross-linker and a catalyst the suitable cure package being selected from a silane having at least three silicon-bonded hydrolysable groups per molecule or polyorganosiloxane having at least three silicon-bonded hydrolysable groups per molecule and a condensation catalyst; and
   (b) 0.1 to 300 parts by weight of at least one phenyl siloxane resin per 100 parts by weight of (a) in which resin (b) is un-reactive with the cross-linker in cure package (d) or has at least two —OH groups or hydrolysable groups;
      wherein resin (b) is selected from T resins in which a majority of the siloxane units are T units.

2. The phenylorganosiloxane polymer composition in accordance with claim 1, wherein filler (c) comprises one or more finely divided, reinforcing fillers selected from high surface area fumed and precipitated silicas, calcium carbonate and/or one or more finely divided, semi-reinforcing or non-reinforcing fillers selected from crushed quartz, diatomaceous earths, barium sulphate, iron oxide, titanium dioxide and carbon black, talc, wollastonite, aluminite, calcium sulphate (anhydrite), gypsum, calcium sulphate, magnesium carbonate, clays aluminium trihydroxide, magnesium hydroxide, graphite, copper carbonate, nickel carbonate, barium carbonate, strontium carbonate, aluminium oxide, and silicates selected from the group consisting of olivine group, garnet group, aluminosilicates, ring silicates, chain silicates, and sheet silicates.

3. The phenylorganosiloxane polymer composition in accordance with claim 2, wherein:
   i) the cross-linker in cure package (d) is selected from one or more of a disilaalkane, alkyltrialkoxysilane, alkenyltrialkoxy silane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo) silane, methyltris(methylethylketoximino) silane, methyltris(isopropenoxy)silane, vinyltris(isopropenoxy) silane, ethylpolysilicate, n-propylorthosilicate, ethylorthosilicate and dimethyltetraacetoxydisiloxane, alkylalkenylbis(N-alkylacetamido) silanes, dialkylbis(N-arylacetamido) silanes, alkylalkenylbis(N-arylacetamido) silanes, or dimethyldi-(N-phenylacetamido)silane;
   ii) the catalyst in cure package (d) is a condensation catalyst selected from organic tin IV metal catalysts, tin II catalysts, 2-ethylhexoates of iron, cobalt, manganese, lead and zinc, titanates, chelated titanates, zirconates and chelated zirconates; or
   iii) both i) and ii).

4. The phenylorganosiloxane polymer composition in accordance with claim 1, wherein the cross-linker in cure package (d) is selected from one or more of a disilaalkane, alkyltrialkoxysilane, alkenyltrialkoxy silane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo) silane, vinyl-tris-methylethylketoximo) silane, methyltris(methylethylketoximino) silane, methyltris(isopropenoxy) silane, vinyltris(isopropenoxy)silane, ethylpolysilicate, n-propylorthosilicate, ethylorthosilicate and dimethyltetraacetoxydisiloxane, alkylalkenylbis(N-alkylacetamido) silanes, dialkylbis(N-arylacetamido) silanes, alkylalkenylbis(N-arylacetamido) silanes, or dimethyldi-(N-phenylacetamido) silane.

5. The phenylorganosiloxane polymer composition in accordance with claim 4, wherein the catalyst in cure package (d) is a condensation catalyst selected from organic tin IV metal catalysts, tin II catalysts, 2-ethylhexoates of iron, cobalt, manganese, lead and zinc, titanates, chelated titanates, zirconates and chelated zirconates.

6. The phenylorganosiloxane polymer composition in accordance with claim 1, further comprising one or more extenders, plasticizers, adhesion promoters, light stabilizers and/or fungicides.

7. The phenylorganosiloxane polymer composition in accordance with claim 6, wherein:
   i) the cross-linker in cure package (d) is selected from one or more of a disilaalkane, alkyltrialkoxysilane, alkenyltrialkoxy silane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo)silane, vinyl-tris-methylethylketoximo) silane, methyltris(methylethylketoximino) silane, methyltris(isopropenoxy)silane, vinyltris(isopropenoxy) silane, ethylpolysilicate, n-propylorthosilicate, ethylorthosilicate and dimethyltetraacetoxydisiloxane, alkylalkenylbis(N-alkylacetamido) silanes, dialkylbis(N-arylacetamido) silanes, alkylalkenylbis(N-arylacetamido) silanes, or dimethyldi-(N-phenylacetamido)silane;
   ii) the catalyst in cure package (d) is a condensation catalyst selected from organic tin IV metal catalysts, tin II catalysts, 2-ethylhexoates of iron, cobalt, manganese, lead and zinc, titanates, chelated titanates, zirconates and chelated zirconates; or
   iii) both i) and ii).

8. The phenylorganosiloxane polymer composition in accordance with claim 1, wherein resin (b) is a mixture of two or more phenyl siloxane resins.

9. The phenylorganosiloxane polymer composition in accordance with claim 1, stored in two or more parts prior to use and comprising i) a first part containing polymer (a) and filler (c) and ii) a second part containing cross-linker and catalyst and optionally, an adhesion promoter.

10. The phenylorganosiloxane polymer composition in accordance with claim 9, wherein resin (b) is contained in both the first part i) and the second part ii).

11. The phenylorganosiloxane polymer composition in accordance with claim 9, wherein resin (b) is present in the first part i) and another resin (b) is present in the second part ii).

12. A sealant derived from the phenylorganosiloxane polymer composition in accordance with claim 1.

13. A method of sealing a space between two units, said method comprising applying the phenylorganosiloxane polymer composition in accordance with claim 1 in the space between the two units and causing or allowing the phenylorganosiloxane polymer composition to cure.

14. A glazing structure or building unit which includes a sealant derived from the phenylorganosiloxane polymer composition in accordance with claim 1.

\* \* \* \* \*